United States Patent
Ishida et al.

(10) Patent No.: US 6,815,397 B2
(45) Date of Patent: Nov. 9, 2004

(54) THERMAL TRANSFER SHEET, INTERMEDIATE TRANSFER RECORDING MEDIUM, AND PRINT PRODUCED USING THE SAME

(75) Inventors: Tadahiro Ishida, Shinjuku-Ku (JP); Katsuyuki Oshima, Shinjuku-Ku (JP); Kozo Odamura, Shinjuku-Ku (JP); Takayuki Imai, Shinjuku-Ku (JP); Etsuo Takasaki, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 123 days.

(21) Appl. No.: 10/163,874

(22) Filed: Jun. 7, 2002

(65) Prior Publication Data

US 2003/0077428 A1 Apr. 24, 2003

(30) Foreign Application Priority Data

Jun. 11, 2001 (JP) .................................... 2001-175460
Jul. 19, 2001 (JP) .................................... 2001-219198
Jul. 19, 2001 (JP) .................................... 2001-219199

(51) Int. Cl.[7] .................... B41M 5/035; B41M 5/38; B41M 5/30

(52) U.S. Cl. .................... 503/227; 156/235; 428/32.51

(58) Field of Search ............................ 8/471; 156/235; 428/32.51; 503/227

(56) References Cited

FOREIGN PATENT DOCUMENTS

JP         03126586    *  5/1991    ................. 503/227

* cited by examiner

*Primary Examiner*—B. Hamilton Hess
(74) *Attorney, Agent, or Firm*—Parkhurst & Wendel, L.L.P.

(57) ABSTRACT

A thermal transfer sheet is provided that can yield thermally transferred images, which possess excellent various fastness or resistance properties even under severe service conditions, and comprises a transferable protective layer having good transferability. In a thermal transfer sheet comprising a substrate sheet and a thermally transferable protective layer on the substrate sheet, the thermally transferable protective layer comprises a scratch-resistant layer which is repeatedly provided one by one for each picture plane unit in the thermal transfer sheet. An area of the scratch-resistant layer for each picture plane unit is smaller than an area of an object in its transfer surface. By virtue of this construction, at the time of the transfer of a protective layer onto an object, layer cutting does not occur within the scratch-resistant layer but within other layer (such as peel layer or adhesive layer), and, consequently, the protective layer can be transferred with good transferability.

3 Claims, 3 Drawing Sheets

THERMAL TRANSFER SHEET, INTERMEDIATE TRANSFER RECORDING MEDIUM, AND PRINT PRODUCED USING THE SAME

BACKGROUND OF THE INVENTION

1. Technical Field

The present invention relates to a thermal transfer sheet and an intermediate transfer recording medium that can yield prints having thermally transferred images, which possess excellent various fastness or resistance properties even under severe service conditions, and can realize the transfer of a transfer portion or a protective layer onto an object with good transferability.

2. Prior Art

Thermal transfer has become extensively used as a simple printing method. The thermal transfer is a method which comprises the steps of: putting a thermal transfer sheet, comprising a colorant layer provided on one side of a substrate sheet, on top of a thermal transfer image-receiving sheet optionally provided with an image-receptive layer; and image-wise heating the backside of the thermal transfer sheet by heating means such as a thermal head to selectively transfer the colorant contained in the colorant layer to form an image on the thermal transfer image-receiving sheet.

Thermal transfer methods are classified into thermal ink transfer (hot melt-type thermal transfer) and thermal dye sublimation transfer (sublimation-type thermal transfer). The thermal ink transfer is a method for image formation wherein a thermal transfer sheet comprising a substrate sheet, such as a PET film, bearing thereon a hot-melt ink layer, comprising a dispersion of a colorant, such as a pigment, in a binder, such as a hot-melt wax or resin, is provided and energy according to image information is applied to heating means such as a thermal head to transfer the colorant together with the binder onto a thermal transfer image-receiving sheet such as paper or plastic sheets. Images produced by the thermal ink transfer have high density and possess high sharpness and are suitable for recording binary images of characters or the like.

On the other hand, the thermal dye sublimation transfer is a method for image formation which comprises the steps of: providing a thermal transfer sheet comprising a substrate sheet, such as a PET film, bearing thereon a dye layer comprising a dye, which is mainly thermally transferred by sublimation, dissolved or dispersed in a resin binder; and applying energy according to image information to heating means such as a thermal head to transfer only the dye onto a thermal transfer image-receiving sheet comprising a substrate sheet, such as paper or a plastic, optionally provided with a dye-receptive layer. The thermal dye sublimation transfer can regulate the amount of the dye transferred according to the quantity of energy applied and thus can form gradation images of which the image density has been regulated dot by dot of the thermal head. Further, since the colorant used is a dye, the formed image is transparent, and the reproduction of intermediate colors produced by superimposing different color dyes on top of each other or one another is excellent. Accordingly, high-quality photograph-like full color images can be formed with excellent reproduction of intermediate colors by transferring different color dyes, such as yellow, magenta, cyan, and black, onto a thermal transfer image-receiving sheet, so as to superimpose the color dyes on top of each other or one another, from a thermal transfer sheet of the different colors.

These thermal transfer methods can simply form various images and thus have become utilized in the formation of prints the number of which may be relatively small. Thermal transfer sheets used with these thermal transfer methods have various practical applications. Representative examples of applications include proof sheets, and recording sheets for output images, output plans or designs drawn by CAD/CAM or the like, or images output from a variety of medical analyzers or measuring instruments such as CT scanners and endoscopic cameras. They can also be used as the alternative of instant photographs, and as paper for producing identity certifications, ID cards, credit cards, and other cards on which facial photographs or the like are printed, or for producing synthetic or memorial photographs which are taken at amusement facilities such as recreation parks, game centers, museums, aquariums and the like.

When ID cards such as identity certifications are prepared using the above thermal transfer sheet, the thermal ink transfer method can easily form binary images of characters, numerals and the like. The thermal ink transfer method, however, is unsuitable for the formation of images required to have high quality, such as a photograph of a face. Further, the formed images are disadvantageously poor in fastness or resistance properties, particularly abrasion resistance. On the other hand, the thermal dye sublimation transfer is suitable for the formation of gradation images such as a photograph of a face. Unlike images formed using printing ink, the images formed by thermal dye sublimation transfer, however, do not contain any vehicle and thus are disadvantageously poor in fastness and resistance properties such as lightfastness and weathering resistance.

In order to overcome the above drawbacks, a method has been adopted wherein a transparent film is laminated onto the surface of the formed image. This method, however, involves a complicate operation. In addition, in this method, since lamination is carried out on the whole object, curling occurs in the object. Further, a very thin film cannot be used for reasons of laminating operation. This inevitably increases the thickness of the whole print.

In order to solve these drawbacks, a method has been proposed wherein a protective layer transfer sheet comprising a substrate film and a transferable resin layer (a protective layer) provided on the substrate film is provided and the transferable resin layer is transferred to provide a protective layer on at least a part of the image. According to this method, fastness or resistance properties such as chemical resistance and lightfastness can be improved to some extent. The fastness and resistance properties of the thermally transferred image, however, are not yet satisfactory under severe practical service conditions. The protective layer transfer sheet is advantageous in that the size of the protective layer (resin layer) transferred can be properly varied, but on the other hand, a tendency toward an increase in protective layer transfer processing speed has made it difficult to transfer the protective layer with good transferability. The protective layer transfer sheet has many additional disadvantages including that, when the fastness or resistance properties of the protective layer, such as heat resistance is improved, heat applied at the time of the transfer of the protective layer is likely to deteriorate the transferability.

The diversification of the applications has led to a demand for the formation of a thermally transferred image on a desired object. A method has been proposed, as one method for meeting this demand, wherein a colorant such as a dye or a pigment is transferred, from a thermal transfer sheet comprising a dye layer or a hot-melt ink layer, onto a receptive layer in an intermediate transfer recording medium comprising the receptive layer separably provided on a substrate to form an image on the receptive layer and, thereafter, the intermediate transfer recording medium is heated to transfer the receptive layer, with the image formed thereon, onto an object (Japanese Patent Laid-Open No. 238791/1987 or the like).

Since the use of the intermediate transfer recording medium permits the receptive layer to be transferred onto an object, this method is preferably used, for example, for objects, onto which a colorant is less likely to be transferred making it impossible to form high-quality images directly on them, and objects which are likely to be fused to the colorant layer at the time of thermal transfer. Further, a method may be adopted wherein necessary matter such as a signature is previously written or printed on an object and, thereafter, a transfer portion, with an image of characters, photographs or the like being formed thereon, is transferred from an intermediate transfer recording medium. Therefore, the intermediate transfer recording medium is preferably used in the preparation of passports or other identity certifications, credit cards/ID cards, or other prints.

The present applicant has proposed in Japanese Patent Laid-Open No. 315639/1998 a receptive layer transfer sheet (an intermediate transfer medium film) wherein, in order to impart fastness and resistance properties, such as lightfastness, weathering resistance, and abrasion resistance, to thermally transferred images on objects such as ID cards, an ionizing radiation-cured resin layer and a receptive layer are separably provided on a substrate.

When the above intermediate transfer recording medium is used, the fastness and resistance properties of the thermally transferred image can be improved. However, the hardness of the ionizing radiation-cured resin layer is so hard that the ionizing radiation-cured resin layer cannot conform to the flexibility of the object, leading to the deformation of the object between the transfer portion and the non-transfer portion of the intermediate transfer recording medium. Further, in transferring the intermediate transfer recording medium onto an object, due to a tendency toward an increase in transfer processing speed, the transferability of the intermediate transfer recording medium is unsatisfactory, and, in this case, for example, uneven edge of the transferred portion or uneven transferred portion, which is disadvantageous from the practical point of view, occurs.

SUMMARY OF THE INVENTION

Accordingly, it is an object of the present invention to solve the above problems of the prior art and to provide a thermal transfer sheet that can yield thermally transferred images, which possess excellent various fastness or resistance properties even under severe service conditions, and comprises a transferable protective layer having good transferability.

It is another object of the present invention to provide an intermediate transfer recording medium, comprising at least a peel layer, a cured product of an ionizing radiation-curable resin layer, and a receptive layer provided in that order on a substrate film, that can yield prints having a thermally transferred image possessing excellent various fastness and resistance properties even under severe service conditions, has good transferability, and can prevent the deformation of an object between the transfer portion and the non-transfer portion of the intermediate transfer recording medium, and to provide a print.

The above object can be attained by a first thermal transfer sheet according to the present invention, comprising a substrate sheet and a thermally transferable protective layer provided on the substrate sheet, wherein the thermally transferable protective layer comprises a scratch-resistant layer; the scratch-resistant layer is repeatedly provided one by one for each picture plane unit in the thermal transfer sheet; and an area of the scratch-resistant layer for each picture plane unit is smaller than an area of an object in its transfer surface. In other words, the area of the object in its transfer surface can also be said to be the size of the outward form of the protective layer formed by the transfer of the thermally transferable protective layer onto the object. The thermally transferable protective layer preferably comprises a peel layer, the scratch-resistant layer, and an adhesive layer provided in that order as viewed from the substrate sheet side. According to this construction, at the time of the transfer of a protective layer onto an object, layer cutting does not occur within the scratch-resistant layer but within other layer (such as peel layer or adhesive layer), and, consequently, the protective layer can be transferred with good transferability.

The scratch-resistant layer is preferably formed from an ionizing radiation-curable resin. Upon exposure to an ultraviolet light or an electron beam, an ionizing radiation-curable resin layer causes crosslinking to form a scratch-resistant layer having a three-dimensional network structure which is strong and possesses excellent various fastness and resistance properties. Further, the protective layer is not cut within the scratch-resistant layer but within the peel layer or adhesive layer having good transferability and is transferred onto an object. The use of the thermal transfer sheet according to the present invention can realize excellent various fastness and resistance properties of thermally transferred images and good transferability in the transfer of a protective layer onto an object even under severe service conditions.

The second thermal transfer sheet according to the present invention comprises a substrate sheet and a thermally transferable protective layer provided on the substrate sheet, wherein the thermally transferable protective layer comprises at least a peel layer, a thermal transfer resin layer, and an adhesive layer provided in that order as viewed from the substrate sheet side, and the thermal transfer resin layer comprises a cured product of an ionizing radiation-curable resin. According to this construction, in the formation of the thermal transfer resin layer, upon exposure to ultraviolet light or electron beam, the ionizing radiation-curable resin layer causes crosslinking and forms a three-dimensional network structure which is strong and possesses excellent various fastness and resistance properties. In the thermal transfer sheet according to the present invention, in order to ensure the fixation of the protective layer onto the object, an adhesive layer is provided on the thermal transfer resin layer, and, in addition, a peel layer is provided between the substrate sheet and the thermal transfer resin layer so that, in the transfer of the protective layer onto the object, the protective layer is faithfully separated from the substrate sheet (that is, so that uneven transfer of the protective layer can be avoided). The use of this thermal transfer sheet can realize excellent various fastness and resistance properties of thermally transferred images and good transferability of the protective layer onto the object even under severe service conditions.

In the thermal transfer sheet according to the present invention, preferably, a thermally transferable colorant layer (s) for at least one color is provided on the substrate sheet, the thermally transferable protective layer is then provided on the substrate sheet so that the thermally transferable colorant layer and the thermally transferable protective layer constitute one picture plane unit, and a combination of the thermally transferable colorant layer with the thermally transferable protective layer is repeatedly provided in a face serial manner for constituting each picture plane unit. In this case, there is no need to provide two thermal transfer sheets, i.e., a thermal transfer sheet for transferring a protective layer and a thermal transfer sheet for forming a thermally transferred image, and the provision of only one thermal transfer sheet suffices for the formation of a thermally transferred image and the transfer of a protective layer. Thus, the efficiency is very high, and, in addition, the production cost of a thermal transfer sheet can be reduced.

The ionizing radiation-curable resin is preferably a urethane-modified acrylic base resin, and, particularly preferably, 5 to 40 parts by weight, based on 100 parts by weight of the urethane-modified acrylic base resin, of an oligomer is contained. In this case, the protective layer is flexible, and, in addition, prints having a thermally transferred image can be obtained which possess excellent fastness and resistance properties such as excellent chemical resistance, lightfastness, and weathering resistance.

According to the present invention, there is provided an intermediate transfer recording medium comprising a substrate film and a transfer portion provided on the substrate film, wherein said transfer portion comprises at least a peel layer, a cured product of an ionizing radiation-curable resin layer, and a receptive layer provided in that order as viewed from the substrate film side, and the ionizing radiation-curable resin layer comprises an urethane-modified acrylic base resin. Upon exposure to ultraviolet light or electron beam, the ionizing radiation-curable resin layer causes crosslinking to form an ionizing radiation-cured resin layer having a three-dimensional network structure which is strong and possesses excellent various fastness and resistance properties. In the ionizing radiation-curable resin layer, particularly preferably, 5 to 40 parts by weight, based on 100 parts by weight, of the urethane-modified acrylic base resin, of an oligomer is contained. In this case, the protective layer transferred onto the object is highly flexible, and the deformation of an object between the transfer portion and the non-transfer portion of the intermediate transfer recording medium can be prevented. This is considered attributable to a difference in shrinkage between the transfer portion and the non-transfer portion.

In the intermediate transfer recording medium according to the present invention, at least a peel layer, a cured product of an ionizing radiation-curable resin layer, and a receptive layer are provided in that order on a substrate film to constitute a transfer portion. The transfer portion can be transferred onto an object without any uneven transfer and with even edge of the transferred portion, that is, with good transferability.

Further, according to the present invention, there is provided a print produced by providing the above intermediate transfer recording medium, wherein the print is obtained by the steps of forming a thermal transfer image on the intermediate transfer recording medium in its transfer portion, and transferring the transfer portion with the image formed thereon onto an object.

DETAILED DESCRIPTION OF THE INVENTION

The first thermal transfer sheet according to the present invention will be explained with reference to the accompanying drawings.

Figure 1A:
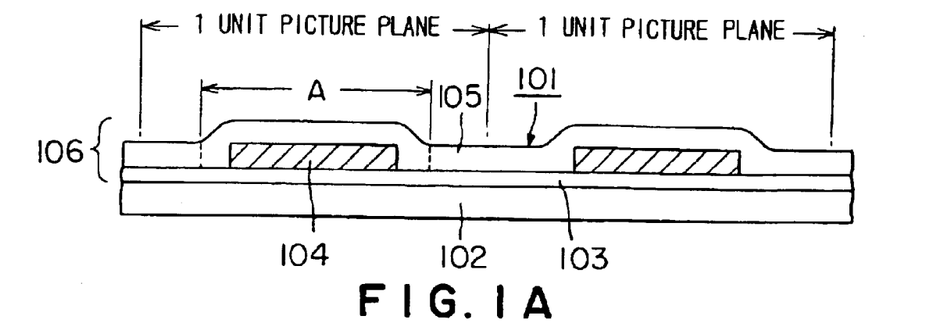
FIG. 1A is a schematic cross-sectional view showing an embodiment of the first thermal transfer sheet according to the present invention.

FIG. 1A is a schematic cross-sectional view showing one embodiment of the first thermal transfer sheet 101 according to the present invention. In the first thermal transfer sheet 101, a peel layer 103, a scratch-resistant layer 104, and an adhesive layer 105 are provided in that order on a substrate sheet 102. In this case, three layers of the peel layer 103, the scratch-resistant layer 104, and the adhesive layer 105 provided on the substrate sheet 102 constitute a thermally transferable protective layer 106. That is, the thermally transferable protective layer 106 is constituted by the scratch-resistant layer 104 and other layers, i.e., the peel layer 103 and the adhesive layer 105. At the same time, in the thermal transfer sheet 101, the scratch-resistant layer 104 is repeatedly provided one by one on the substrate sheet 102 for each picture plane unit. In this case, the size of the scratch-resistant layer 104 is smaller than the size A of an object in its transfer surface. By virtue of this construction, at the time of the transfer of the protective layer 106 onto an object, layer cutting does not occur in the scratch-resistant layer 104 but within the adhesive layer 105 (and the peel layer 103), and, consequently, the protective layer can be transferred with good transferability. A heat-resistant slip layer (not shown) can be provided on the substrate sheet 102 in its surface remote from the thermally transferable protective layer 106 from the viewpoint of preventing sticking, cockling and other unfavorable phenomena caused by heat of a thermal head, a heat roll or the like.

Figure 1B:
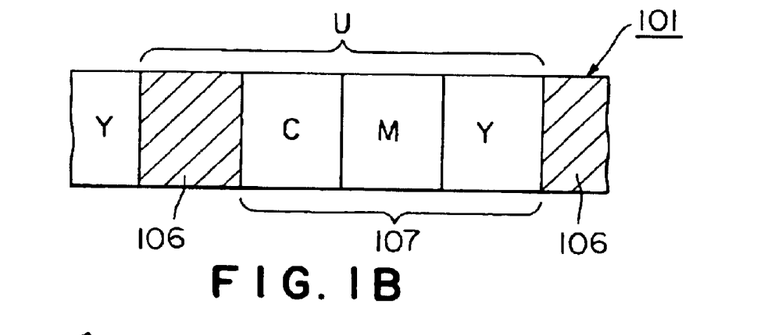
FIG. 1B is a schematic plan view showing another embodiment of the first thermal transfer sheet according to the present invention.

FIG. 1B is a schematic plan view showing another embodiment of the first thermal transfer sheet 101 according to the present invention. In this embodiment, thermally transferable colorant layers 107 of yellow (Y), magenta (M), and cyan (C) are provided on a substrate sheet 102 and a thermally transferable protective layer 106 is then provided on the substrate sheet 102. One unit (U) of a combination of the thermally transferable colorant layers 107 with the thermally transferable protective layer 106 is then repeatedly provided in a face serial manner. The thermally transferable protective layer comprises at least a scratch-resistant layer and other layers, although these layers are not shown because the drawing is not a cross-sectional view but a plan view.

Figure 1C:
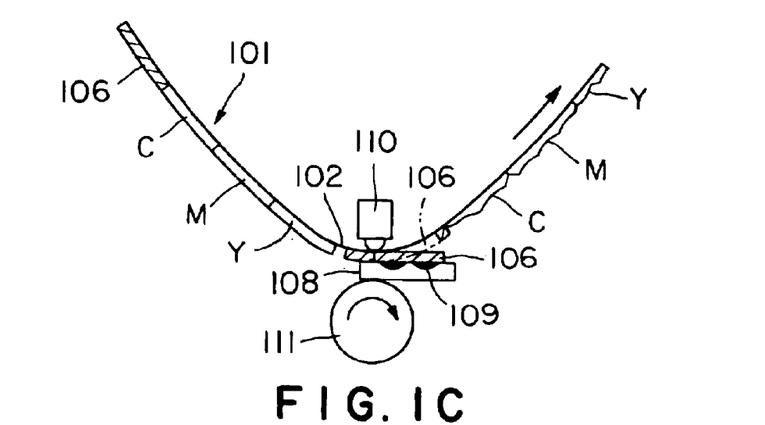
FIG. 1C is a schematic explanatory view showing an embodiment wherein a protective layer is thermally transferred onto an object using the first thermal transfer sheet according to the present invention.

FIG. 1C is a schematic explanatory view showing an embodiment wherein a protective layer 106 is thermally transferred onto an object 108 using the first thermal transfer sheet 101 according to the present invention. In this embodiment, thermally transferable colorant layers 107 of at least three colors of yellow, magenta, and cyan are provided on a substrate sheet 102, and a thermally transferable protective layer 106 is then provided on the substrate sheet 102. One unit of a combination of the thermally transferable colorant layers 107 with the thermally transferable protective layer 106 is repeatedly formed in a face serial manner to form the thermal transfer sheet 101. The thermal transfer sheet 101 is used to thermally transfer the colorant layer 107 in the thermal transfer sheet 101 onto the object 108 by means of a thermal head 110 to form an image 109. The protective layer 106 is thermally transferred by the thermal head 110 from the thermal transfer sheet 101 onto the image 109 so as to cover at least the printed portion, and the substrate sheet 102 is then separated from the object 108. Although the layer construction of the thermally transferable protective layer is not shown, the scratch-resistant layer has a size smaller than the size of the protective layer 106 thermally transferred onto the object 108 and covers the printed image.

Figure 1D:
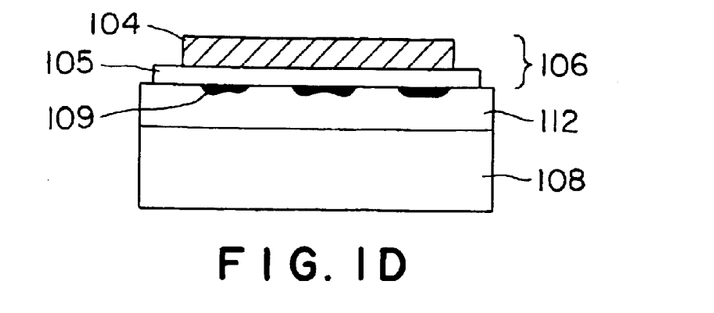
FIG. 1D is a schematic cross-sectional view showing an assembly after the transfer of a thermally transferable protective layer, using the first thermal transfer sheet according to the present invention, onto an object with a thermally transferred image formed thereon.

FIG. 1D is a schematic cross-sectional view showing an assembly after the transfer of a thermally transferable protective layer, using the first thermal transfer sheet according to the present invention, onto an object with a thermally transferred image formed thereon.

A receptive layer 112 is previously formed on an object 108, and a thermally transferred image 109 is then formed on the receptive layer using a thermal transfer sheet comprising thermally transferable colorant layers provided on a substrate. Thereafter, a protective layer 106 is transferred using the thermal transfer sheet according to the present invention provided with the thermally transferable protective layer 106 so as to cover the thermally transferred image 109. The adhesive layer 105 is transferred onto a portion which comes into contact with the thermally transferred image 109, and the scratch-resistant layer 104 is stacked onto the adhesive layer 105 so that the size of the scratch-resistant layer 104 is smaller than the size of the transferred adhesive layer 105.

Thermal Transfer Sheet
Substrate Sheet:

In the thermal transfer sheet according to the present invention, any substrate sheet used in conventional thermal transfer sheets may be used so far as the substrate sheet has some level of heat resistance and strength, and examples thereof include tissue papers, such as glassine paper, capacitor paper, and paraffin paper; and films of plastics, for example, polyesters, such as polyethylene terephthalate and polyethylene naphthalate, polypropylene, cellophane, polycarbonate, cellulose acetate, polyethylene, polyvinyl chloride, polystyrene, nylon, polyimide, polyvinylidene chloride, and ionomers. The thickness of the substrate sheet may be properly varied depending upon materials for the substrate sheet so that the substrate sheet has proper strength, heat resistance and other properties. However, the thickness is 2 to 100 $\mu$m, preferably about 10 to 80 $\mu$m.

In order to regulate the surface gloss of the print after the transfer of the protective layer, a matte polyethylene terephthalate film may be used as the substrate sheet. Sandblasting, incorporation, internal foaming and the like may be mentioned as means for matting.

Peel Layer:

In the thermal transfer sheet according to the present invention, the scratch-resistant layer is preferably provided on the substrate sheet through a peel layer 103. The provision of the peel layer permits the scratch-resistant layer to be surely and easily transferred from the thermal transfer sheet onto an object.

The peel layer may comprise, for example, waxes, such as microcrystalline wax, carnauba wax, paraffin wax, Fischer-Tropsh wax, various types of low-molecular weight polyethylene, Japan wax, beeswax, spermaceti, insect wax, wool wax, shellac wax, candelilla wax, petrolactum, partially modified wax, fatty esters, and fatty amides, and thermoplastic resins, such as silicone wax, silicone resin, fluororesin, acrylic resin, polyester resin, polyurethane resin, cellulose resin, vinyl chloride-vinyl acetate copolymer, and nitrocellulose.

Further, the peel layer may comprise a binder resin and a releasable material. Binder resins usable herein include thermoplastic resins, for example, acrylic resins, such as polymethyl methacrylate, polyethyl methacrylate, polybutyl acrylate, vinyl resins, such as polyvinyl acetate, vinyl chloride-vinyl acetate copolymer, polyvinyl alcohol, and polyvinylbutyral, and cellulose derivatives, such as ethylcellulose, nitrocellulose, and cellulose acetate, and thermosetting resins, for example, unsaturated polyester resins, polyester resins, polyurethane resins, and aminoalkyd resins. Releasable materials include waxes, silicone wax, silicone resins, melamine resins, fluororesins, fine powders of talc or silica, and lubricants such as surfactants or metal soaps.

The peel layer may be formed by dissolving or dispersing the above-described necessary materials in a suitable solvent to prepare a coating liquid for a peel layer, coating the coating liquid onto a substrate sheet by gravure printing, screen printing, reverse coating using a gravure plate or other means, and drying the coating. The coverage is generally 0.1 to 10 g/m$^2$ on a dry basis.

Scratch-resistant Layer:

The first thermal transfer sheet according to the present invention comprises a substrate sheet and, provided on the substrate sheet, at least a scratch-resistant layer and other layers which constitute a thermally transferable protective layer.

In the thermally transferable protective layer, the scratch-resistant layer 104 mainly functions to impart various fastness and resistance properties to thermally transferred images. This scratch-resistant layer preferably comprises a cured product of an ionizing radiation-curable resin and will be specifically described below.

A composition prepared by properly mixing prepolymers, oligomers and/or monomers containing, in the molecule thereof, polymerizalbe unsaturated bonds, such as (meth) acryloyl and (meth)acryloyloxy groups ((meth)acryloyl referring to acryloyl or methacryloyl; for (meth), the same shall apply hereinafter) or epoxy group together may be mentioned as the ionizing radiation-curable resin. Prepolymers and oligomers include acrylates, such as urethane (meth)acrylate, polyester (meth)acrylate, and epoxy(meth) acrylate, silicone resins such as siloxane, and unsaturated polyesters, and epoxy.

Examples of monomers include styrene monomers such as styrene and α-methylstyrene, methyl (meth)acrylate, (meth)acrylic acid-2-ethylhexyl, dipentaerythritol hexa (meth)acrylate, dipentaerythritol penta(meth)-acrylate, trimethylolpropane tri(meth)acrylate, and/or polyol compounds containing, in the molecule thereof, two or more thiol groups, for example, trimethyolpropane trithioglycolate, trimethyolpropane trithiopropylate, and pentaerythritol tetrathioglycol. One of or a mixture of two or more of the above compounds is used according to need. In order to impart ordinary coatability to the resin composition, the resin composition preferably comprises not less than 5% by weight of the prepolymer or the oligomer and not more than 95% by weight of the monomer and/or polythiol.

In the selection of the monomer, when the cured product is required to be flexible, a structure having a relatively low degree of crosslinking is adopted by bringing the amount of the monomer to a relatively small one or using a monofunctional or bifuctional acrylate monomer with caution so as not to sacrifice various fastness and resistance properties of the scratch-resistant layer and the coatability.

For example, when the cured product is required to be heat resistant, hard, or resistant to solvents, a structure having a high degree of crosslinking is preferably adopted by bringing the amount of the monomer to a relatively large one with caution so as not to sacrifice the coatability or using a tri- or higher functional acrylate monomer. A method may also be used wherein a monofunctional or bifunctional monomer is mixed with a tri- or higher functional monomer to regulate coatability and properties of the cured product.

Monofunctional acrylate monomers include 2-hydroxy acrylate, 2-hexyl acrylate, and phenoxyethyl acrylate. Bifunctional acrylate monomers include ethylene glycol diacrylate and 1,6-hexanediol diacrylate, and tri- or higher functional acrylate monomers include trimethylol propane triacrylate, pentaerythritol hexaacrylate, and dipentaerythritol hexaacrylate.

A mixture of at least one of the above prepolymers, oligomers, and monomers with about 1 to 50% by weight of the following ionizing radiation-non-curable resin may be used from the viewpoint of regulating properties of the cured product such as flexibility and surface hardness. Ionizing radiation-non-curable resins include urethane, cellulosic, polyester, acrylic, butyral, polyvinyl chloride, polyvinyl acetate and other thermoplastic resins.

The scratch-resistant layer of the thermal transfer sheet according to the present invention has excellent various fastness and resistance properties and a suitable level of flexibility, which affects handleability, appearance, etc. of prints after transfer, and thus is preferably formed from a urethane-modified acrylic base resin as an ionizing radiation-curable resin. Further, the use of an ionizing radiation-curable resin comprising the urethane-modified acrylic base resin and 5 to 40 parts by weight, based on 100 parts by weight of the urethane-modified acrylic base resin, of an oligomer is suitable.

The urethane-modified acrylic base resin contains a urethane bond therein produced as a result of a reaction of a hydroxyl group (—OH) present in the acrylic resin with an isocyanate (—NCO), and, preferably, 5 to 40 parts by weight of an oligomer is contained based on 100 parts by weight of the urethane-modified acrylic base resin. This can impart an excellent function, i.e., a combination of flexibility with fastness and resistance properties, to the protective layer.

Regarding the additive to the urethane-modified acrylic base resin, in addition to the oligomer, monomers may also be of course added. When the amount of the oligomer used is small, the strength, fastness and resistance properties and other properties of the resin layer are unsatisfactory. On the other hand, when the amount of the oligomer used is excessively large, the tackiness of the surface of the resin layer is so high that, for example, blocking is disadvantageously likely to occur.

When the ionizing radiation-curable resin is cured by ionizing radiation irradiation, a transparent resin should be used. Photopolymerization initiators, such as acetophenones, benzophenones, Michler's benzoyl benzoate, α-amyloxime ester, tetramethylthiuram monosulfide, and thioxanthones, and/or photosensitizers, such as n-butylamine, triethylamine, and tri-n-butylphosphine, may be incorporated into the ionizing radiation-curable resin composition. Further, preferably, silicone resins, waxes, fluororesins, melanine resins, surfactants or the like is incorporated from the viewpoint of releasability.

In the present invention, ultraviolet light is mainly used for fully curing the thermal transfer resin layer comprising the ionizing radiation-curable resin-containing resin composition on the substrate sheet. However, among electromagnetic radiations or charged particle beams, visible light, γ radiation, and X radiation, which are ionizing radiations having energy quantum capable of polymerizing or crosslinking molecules, are also usable.

An ultraviolet irradiation device is generally used as an ionizing radiation irradiation device. Ultrahigh-pressure mercury lamp, high-pressure mercury lamp, low-pressure mercury lamp, carbon arc, blacklight, a metal halide lamp and other light sources are usable as the ultraviolet irradiation device. Electrons having an energy of 100 to 1000 KeV, preferably 100 to 300 KeV, are applied from the device. The exposure is generally about 5 to 300 KGy (kilogray).

The scratch-resistant layer may be formed by dissolving or dispersing a composition containing an ionizing radiation-curable resin for the scratch-resistant layer in a suitable solvent to prepare an ink for a thermal transfer resin layer, coating the ink onto the substrate sheet by coating means, such as gravure printing, screen printing, or reverse coating using a gravure plate, and drying the coating.

The scratch-resistant layer may be formed in any desired thickness on the substrate sheet. The thickness, however, is 0.1 to 50 g/m$^2$, preferably about 1 to 20 g/m$^2$, on a dry basis.

Adhesive Layer:

An adhesive layer 105 may be provided on the surface of the thermally transferable protective layer in the thermal transfer sheet according to the present invention from the viewpoint of improving the transferability and adhesion to prints as the object. The adhesive layer may comprise any of conventional pressure-sensitive adhesives or heat-sensitive adhesives, preferably comprise a thermoplastic resin having a glass transition temperature (Tg) of 50° C. to 80° C. Preferably, for example, a resin having a suitable glass transition temperature is selected from resins having good thermal adhesion, such as polyester resins, vinyl chloride-vinyl acetate copolymer resins, acrylic resins, butyral resins, epoxy resins, polyamide resins, and vinyl chloride resins. The above resin preferably has low molecular weight from the viewpoint of adhesion or when the adhesive layer is formed as a pattern on a part of the thermally transferable protective layer, rather than the whole area of the thermally transferable protective layer, by heating means such as a thermal head.

A coating liquid prepared by optionally adding additives such as inorganic or organic fillers to the above resin for the adhesive layer is coated by the same coating means as used in the formation of the thermal transfer resin layer, and the coating is then dried to form an adhesive layer preferably at a coverage of about 0.5 to 10 g/m² on a dry basis.

In the first thermal transfer sheet according to the present invention, an antistatic layer may be provided on the outermost surface of the thermal transfer sheet on its side where the thermally transferable protective layer is provided, or on the outermost surface of the thermal transfer sheet in its side remote from the thermally transferable protective layer, or on the outermost surface of the thermal transfer sheet on its both sides. The antistatic layer may be formed by dissolving or dispersing an antistatic agent, such as a fatty ester, a sulfuric ester, a phosphoric ester, an amide, a quaternary ammonium salt, a betaine, an amino acid, an acrylic resin, or an ethylene oxide adduct, in a solvent to prepare a solution or a dispersion and coating the solution or the dispersion. Means for the formation of the antistatic layer may be the same as described above in connection with the formation of the scratch-resistant layer. The coverage of the antistatic layer is preferably 0.001 to 0.1 g/m² on a dry basis.

An intermediate layer comprising various resins may be provided between the peel layer and the scratch-resistant layer or between the scratch-resistant layer and the adhesive layer. The intermediate layer is preferably transparent so that the thermally transferred image can be seen through the intermediate layer. Excellent function can be added to the thermal transfer sheet by imparting various functions to the intermediate layer. For example, resins having high level of elastic deformation or plastic deformation, for example, polyolefin resin, vinyl copolymer resin, polyurethane resin, and polyamide resin, may be used as resins for imparting cushioning properties. Further, in order to impart antistatic capability to the intermediate layer, the intermediate layer may be formed by adding the above antistatic agent to the resin for imparting cushioning properties, dissolving or dispersing the mixture in a solvent to prepare a solution or a dispersion, and coating the solution or the dispersion.

Next, the second thermal transfer sheet according to the present invention will be explained.

Figure 2A:
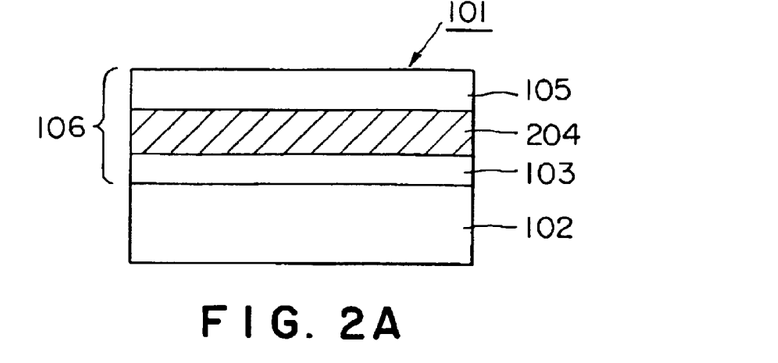
FIG. 2A is a schematic cross-sectional view showing an embodiment of the second thermal transfer sheet according to the present invention.

FIG. 2A is a schematic cross-sectional view showing one embodiment of the second thermal transfer sheet 101 according to the present invention. In this embodiment, a peel layer 103, a thermal transfer resin layer 204, and an adhesive layer 105 are provided in that order on a substrate sheet 102. In this case, three layers of the peel layer 103, the thermal transfer resin layer 204, and the adhesive layer 105 provided on the substrate sheet 102 constitute a thermally transferable protective layer 106. The thermal transfer resin layer 204 comprises a cured product of an ionizing radiation-curable resin. A heat-resistant slip layer (not shown) can be provided on the substrate sheet 102 in its surface remote from the thermally transferable protective layer 106 from the viewpoint of preventing sticking, cockling and other unfavorable phenomena caused by heat of a thermal head, a heat roll or the like.

Figure 2B:
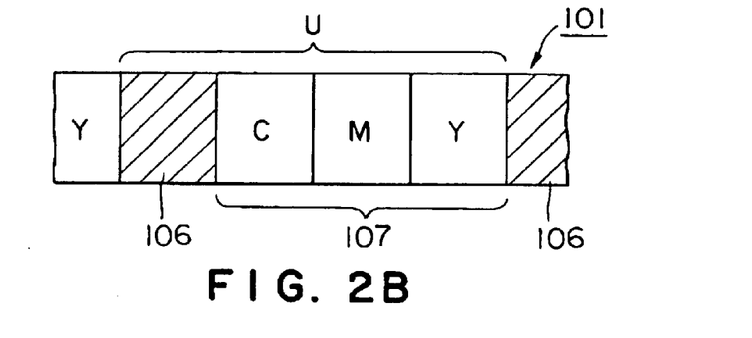
FIG. 2B is a schematic plan view showing another embodiment of the second thermal transfer sheet according to the present invention.

FIG. 2B is a schematic plan view showing an embodiment of the second thermal transfer sheet 101 according to the present invention. In this embodiment, thermally transferable colorant layers 107 of yellow (Y), magenta (M), and cyan (C) are provided on a substrate sheet and a thermally transferable protective layer 106 is then provided on the substrate sheet. One unit (U) of a combination of the thermally transferable colorant layers 107 with the thermally transferable protective layer 106 is then repeatedly provided in a face serial manner. The thermally transferable protective layer comprises at least a peel layer, a thermal transfer resin layer, and an adhesive layer, although these layers are not shown because the drawing is not a cross-sectional view but a plan view.

Figure 2C:
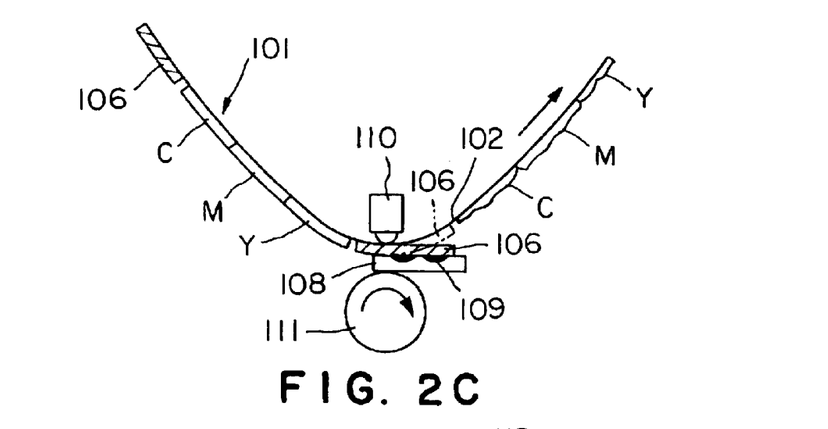
FIG. 2C is a schematic explanatory view showing an embodiment wherein a protective layer is thermally transferred onto an object using the second thermal transfer sheet according to the present invention.

FIG. 2C is a schematic explanatory view showing an embodiment wherein a protective layer 106 is thermally transferred onto an object 108 using the second thermal transfer sheet 101 according to one embodiment of the present invention. In this case, thermally transferable colorant layers 107 of at least three colors of yellow, magenta, and cyan are provided on a substrate sheet 102, and a thermally transferable protective layer 106 is then provided on the substrate sheet 102. One unit of a combination of the thermally transferable colorant layers 107 with the thermally transferable protective layer 106 is repeatedly formed in a face serial manner to form the thermal transfer sheet 101. The thermal transfer sheet 101 is used to thermally transfer the colorant layer 107 in the thermal transfer sheet 101 onto the object 108 by means of a thermal head 110 to form an image 109. The protective layer 106 is thermally transferred by the thermal head 110 from the thermal transfer sheet 101 onto the image 109 so as to cover at least the printed portion, and the substrate sheet 102 is then separated from the object 108.

Figure 2D:
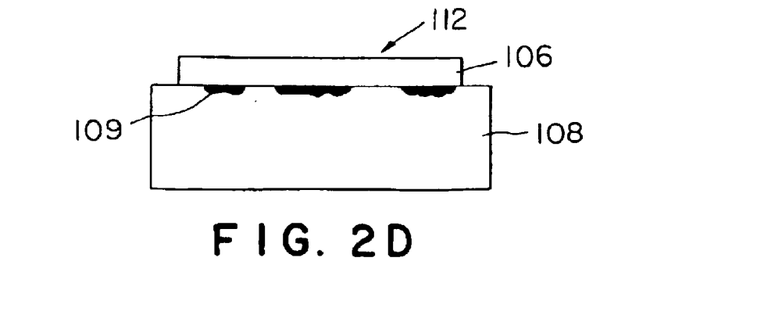
FIG. 2D is a schematic cross-sectional view showing an assembly after the transfer of a thermally transferable protective layer, using the second thermal transfer sheet according to the present invention, onto an object with a thermally transferred image formed thereon.

FIG. 2D is a schematic cross-sectional view showing an assembly after the transfer of a thermally transferable protective layer, using the second thermal transfer sheet according to the present invention, onto an object with a thermally transferred image formed thereon.

A receptive layer 112 is previously formed on an object 108, and a thermally transferred image 109 is then formed on the receptive layer using a thermal transfer sheet comprising thermally transferable colorant layers provided on a substrate. Thereafter, a protective layer 106 is transferred using the thermal transfer sheet according to the present invention provided with the thermally transferable protective layer 106 so as to cover the thermally transferred image 109. The adhesive layer 105 is transferred onto a portion which comes into contact with the thermally transferred image 109, and the scratch-resistant layer 104 is stacked onto the adhesive layer 105 so that the size of the scratch-resistant layer 104 is smaller than the size of the transferred adhesive layer 105.

The substrate sheet constituting the second thermal transfer sheet according to the present invention may be the same as that used in the first thermal transfer sheet.

In the second thermal transfer sheet according to the present invention, a thermal transfer resin layer is provided on the substrate sheet through the peel layer 103. The provision of the peel layer permits the thermal transfer resin layer and the adhesive layer provided on the resin layer to be surely and easily transferred from the thermal transfer sheet onto an object. The peel layer may be the same as that used in the first thermal transfer sheet.

The second thermal transfer sheet according to the present invention comprises a substrate sheet and, provided on the substrate sheet, at least a peel layer, a thermal transfer resin layer, and an adhesive layer in that order. At least three layers of the peel layer, the thermal transfer resin layer, and the adhesive layer constitute the thermally transferable protective layer.

In the thermally transferable protective layer, the thermal transfer resin layer 204 mainly functions to impart various fastness and resistance properties to thermally transferred images. This thermal transfer resin layer may comprise a cured product of an ionizing radiation-curable resin which may be the same as that used in the first thermal transfer sheet. The ionizing radiation-curable resin may be cured in the same manner as described above.

The thermal transfer resin layer may be formed by dissolving or dispersing a composition containing the ionizing radiation-curable resin for the thermal transfer resin layer in a suitable solvent to prepare an ink for the formation of a thermal transfer resin layer, coating the ink onto the substrate sheet by coating means, such as gravure printing, screen printing, or reverse coating using a gravure plate, and drying the coating.

The thermal transfer resin layer may be formed in any desired thickness on the substrate sheet. The thickness, however, is 0.1 to 50 g/m$^2$, preferably about 1 to 20 g/m$^2$, on a dry basis.

The adhesive layer 5 constituting the thermally transferable protective layer in the thermal transfer sheet according to the present invention functions to impart good transferability and adhesion onto prints as objects to the surface of the thermally transferable protective layer. This adhesive layer may be the same as that used in the first thermal transfer sheet.

The second thermal transfer sheet according to the present invention comprises at least a substrate sheet, a peel layer, a thermal transfer resin layer, and an adhesive layer. An antistatic layer may be provided on the surface of the adhesive layer, on the backside of the substrate sheet, or on the outermost surface of the thermal transfer sheet in its both sides. The antistatic layer may be the same as that used in the first thermal transfer sheet.

Further, an intermediate layer comprising various resins may be provided between the peel layer and the thermal transfer resin layer or between the thermal transfer resin layer and the adhesive layer. The intermediate layer is preferably transparent so that the thermally transferred image can be seen through the intermediate layer. Excellent function can be added to the thermal transfer sheet by imparting various functions to the intermediate layer. The intermediate layer may be the same as that used in the first thermal transfer sheet.

In the first and second thermal transfer sheets according to the present invention, if necessary, a heat-resistant slip layer may be provided on the backside of the substrate sheet, that is, on the surface of the substrate sheet remote from the thermally transferable protective layer, from the viewpoint of preventing sticking, cockling and other unfavorable phenomena caused by heat of thermal transfer means such as a thermal head or a heat roll.

Any conventional resin may be used as the resin for constituting the heat-resistant slip layer, and examples thereof include polyvinyl butyral resins, polyvinyl acetoacetal resins, polyester resins, vinyl chloride-vinyl acetate copolymers, polyether resins, polybutadiene resins, styrene-butadiene copolymers, acrylic polyols, polyurethane acrylates, polyester acrylates, polyether acrylates, epoxy acrylates, prepolymers of urethane or epoxy, nitrocellulose resins, cellulose nitrate resins, cellulose acetopropionate resins, cellulose acetate butyrate resins, cellulose acetate hydrodiene phthalate resins, cellulose acetate resins, aromatic polyamide resins, polyimide resins, polycarbonate resins, chlorinated polyolefin resins, and chlorinated polyolefin resins.

Slipperiness-imparting agents added to or topcoated on the heat-resistant slip layer comprising the above resin include phosphoric esters, silicone oils, graphite powder, silicone graft polymers, fluoro graft polymers, acrylsilicone graft polymers, acrylsiloxanes, arylsiloxanes, and other silicone polymers. Preferred a layer comprises a polyol, for example, a high-molecular polyalochol compound, a polyisocyanate compound and a phosphoric ester compound. Further, the addition of a filler is more preferred.

The heat-resistant slip layer may be formed by dissolving or dispersing the resin, the slipperiness-imparting agent, and a filler in a suitable solvent to prepare an ink for the formation of a heat-resistant slip layer, coating the ink onto the backside of the substrate sheet by coating means, such as gravure printing, screen printing, or reverse coating using a gravure plate, and drying the coating.

Thermally Transferable Colorant Layer:

The thermally transferable colorant layer 7 provided on the substrate sheet in the thermal transfer sheet according to the present invention may be either a dye layer comprising a solution or dispersion of a dye, which is mainly thermally transferred by sublimation, in a resin binder, or a heat-fusion ink layer comprising a dispersion of a colorant such as a pigment or a dye in a binder such as heat-fusion wax or resin. Further, a method may also be used wherein, for example, colorant layers of yellow, magenta, and cyan as sublimable dye layers and a heat-fusion ink layer as a black color layer are provided in combination in a face serial manner.

The dye layer as the thermally transferable colorant layer is a layer comprising a dye supported by a proper binder resin. Dyes commonly used in conventional thermal transfer sheets may be effectively used without particular limitation. For example, MS Red G, Macrolex Red Violet R, Ceres Red 7B, Samaron Red HBSL, and Resolin Red F 3BS may be mentioned as several examples of magenta dyes. Phorone Brilliant Yellow 6 GL, PTY-52, Macrolex Yellow 6G and the like may be mentioned as yellow dyes. Kayaset Blue 714, Waxoline Blue AP-FW, Phorone Brilliant Blue S-R, and MS Blue 100 may be mentioned as cyan dyes.

Any conventional binder resin may be used for carrying the above dyes, and examples of preferred binder resins include: cellulosic resins such as ethylcellulose, hydroxyethylcellulose, ethylhydroxycellulose, hydroxypropylcellulose, methylcellulose, cellulose acetate, and cellulose acetate butyrate; vinyl resins such as polyvinyl alcohol, polyvinyl acetate, polyvinyl butyral, polyvinyl acetal, polyvinyl pyrrolidone, and polyacrylamide; and polyesters. Among them, for example, cellulosic, acetal, butyral, and polyester resins are preferred from the viewpoints of heat resistance, transferability of dyes and the like. Further, if necessary, various conventional other additives may be incorporated into the dye layer.

Dye layers are preferably formed by adding the sublimable dye, the binder resin and other optional ingredients to a suitable solvent to dissolve or disperse the ingredients in the solvent to prepare coating materials or inks for the formation of dye layers, coating the coating materials or the inks in a face serial manner on the substrate film, and drying the coatings. The coverage of the dye layer is about 0.2 to 5.0 g/m$^2$, preferably about 0.4 to 2.0 g/m$^2$, on a dry basis. The content of the sublimable dye in the dye layer is suitably 5 to 90% by weight, preferably 10 to 70% by weight, based on the dye layer.

The heat-fusion ink layer as the thermally transferable colorant layer comprises a colorant, a binder and optional desired additives. Among organic or inorganic pigments or dyes, those having good properties as a recording material, for example, those, which have satisfactory color density and are less likely to cause color change and fading upon exposure to light, heat, and temperature, are preferred as the colorant. Colorants having black, cyan, magenta, yellow, and other hues are usable. The binder used is composed mainly of wax and further comprises a mixture of a drying oil, a resin, a mineral oil, cellulose, and a rubber derivative.

Waxes include microcrystalline wax, carnauba wax, and paraffin wax. Further, other various waxes such as Fischer-Tropsh wax, various types of low-molecular weight polyethylene, Japan wax, beeswax, spermaceti, insect wax, wool wax, shellac wax, candelilla wax, petrolactum, polyester wax, partially modified wax, fatty esters, and fatty amides may also be used. A vinyl chloride-vinyl acetate copolymer resin, an acrylic resin, or a combination of an acrylic resin with a chlorinated rubber, a vinyl chloride-vinyl acetate copolymer resin, a cellulosic resin or the like may be used as the binder used in the heat-fusion ink layer.

The heat-fusion ink layer may be formed at a coverage of about 1 to 8 $g/m^2$ on a dry basis, for example, by hot melt coating, hot lacquer coating, gravure coating, gravure reverse coating, knife coating, air coating, or roll coating a composition for a heat-fusion ink layer comprising the colorant, the binder and optional additives.

An image formation method for providing a print, which comprises an image thermally transferred onto an object and a protective layer transferred onto the image, using the thermal transfer sheet according to the present invention will be described.

A thermal transfer sheet comprising a thermally transferable colorant layer provided on a substrate sheet is first provided. A colorant is thermally transferred from the colorant layer onto an object to form an image. Next, a protective layer is thermally transferred from a thermal transfer sheet, comprising a thermally transferable protective layer provided separately on the substrate sheet, onto the image so as to cover at least the printed portion, and the substrate sheet is then separated.

In the thermal transfer recording method used for forming an image on an object, recording is carried out by generating thermal energy controlled by image signals by means of a thermal head and using the thermal energy as energy for activating a recording material such as ink. In this case, a thermal transfer sheet comprising a thermally transferable colorant layer provided on a substrate sheet is put on top of recording paper. The laminate is passed through between a thermal head and a platen which are under a suitable applied pressure. The thermal head of which the temperature has been raised by energization activates the recording material, and an image is transferred onto the recording paper with the aid of the pressure of the platen.

Thermal transfer recording methods are classified into thermal dye sublimation transfer (sublimation-type thermal transfer) and thermal ink transfer (hot melt-type thermal transfer). Any of these methods may be used in the formation of an image in the print according to the present invention. A method may also be adopted wherein a combination of the thermal dye sublimation transfer with the thermal ink transfer is used in such a manner that, for example, a gradation image portion is formed by the thermal dye sublimation transfer recording while a character portion is formed by the thermal ink transfer recording.

The thermal transfer recording may also be carried out by thermal transfer means, wherein heating is carried out by laser beam irradiation, in addition to the above thermal head method.

Further, in the present invention, examples of means usable for the thermal transfer of the protective layer include: a method wherein a print and a thermal transfer sheet comprising a thermally transferable protective layer provided on a substrate sheet are sandwiched between the thermal head and the platen and heating is carried out from the thermal head; a heat roll method which is adopted in many of commercially available laminators and performs hot pressing by means of a pair of heat rolls; a method wherein the print and the thermal transfer sheet are sandwiched between heated flat plates or between a heated flat plate and a roll and, in this state, hot pressing is carried out; and a thermal transfer method using laser irradiation for heating.

When a thermal head is used as the thermal transfer means for the protective layer, the same thermal head as used in the formation of the image may be used, or alternatively a thermal head different from that used in the formation of the image may be used. Preferably, however, from the viewpoint of efficiency, a method is used wherein a thermal transfer sheet, comprising a substrate sheet and, provided on the substrate sheet, a thermally transferable colorant layer of at least one color and a thermally transferable protective layer which have been repeatedly provided in a face serial manner, is provided and thermal transfer is carried out onto an object by the thermal transfer means for the formation of an image and the thermal transfer means for the formation of a protective layer in a single thermal transfer printer in an in-line manner.

In the transfer of a protective layer onto an object using the thermal transfer sheet according to the present invention, a protective layer is formed by transfer onto a thermally transferred image in a predetermined object. In this case, registration should be accurately carried out so that particularly a scratch-resistant layer is located on the thermally transferred image. To this end, preferably, a method is adopted wherein a conventional detection mark for detecting the position in the transfer of a protective layer is provided in the thermal transfer sheet according to the present invention and is detected with a detector and this detection is interlocked with a thermal transfer device to register the object with the transfer position of the protective layer.

Next, the intermediate transfer recording medium according to the present invention will be described.

Figure 3A:
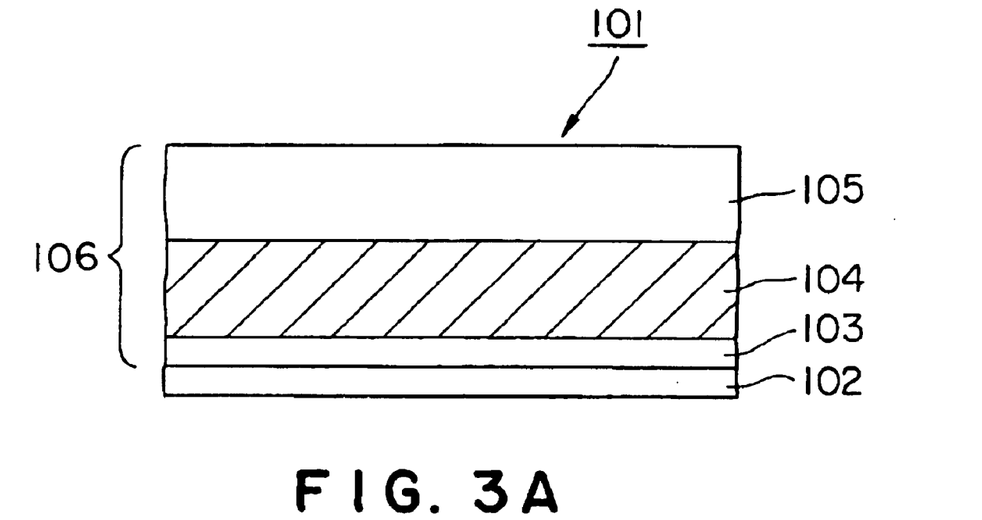
FIG. 3A is a cross-sectional view showing one embodiment of the intermediate transfer recording medium according to the present invention.

FIG. 3A is a cross-sectional view showing one embodiment of the intermediate transfer recording medium according to the present invention. An intermediate transfer recording medium 301 comprises a substrate film 302 and a transfer portion 306 provided separately on the substrate film 302. The transfer portion 306 comprises a peel layer 303, an ionizing radiation-cured resin layer 304, and a receptive layer 305 provided in that order as viewed from the substrate film 302 side.

Figure 3B:
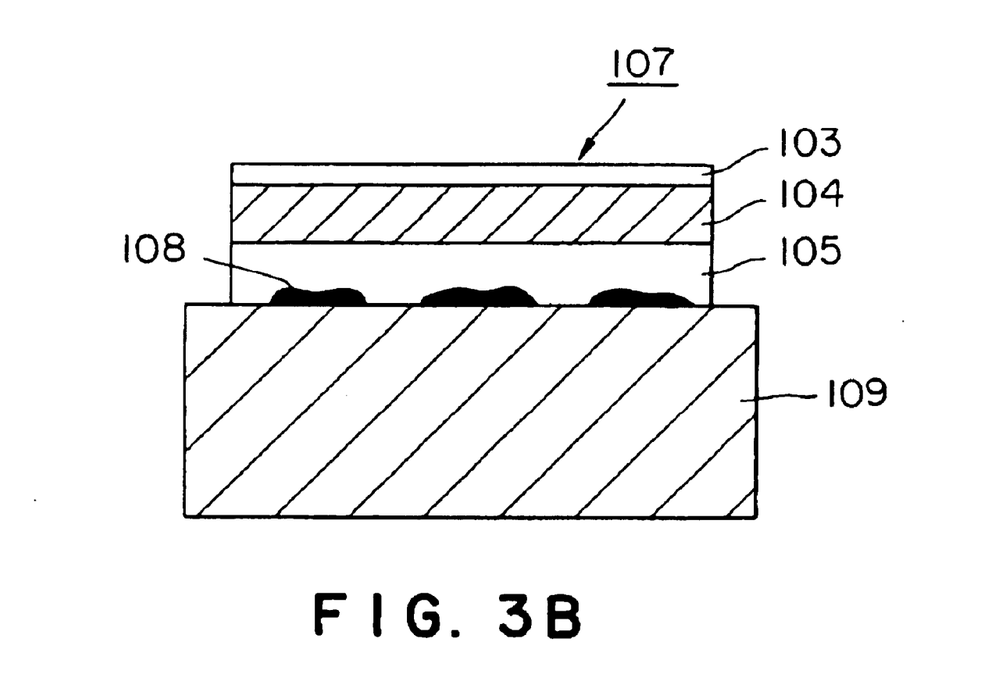
FIG. 3B is a cross-sectional view showing one embodiment of the print according to the present invention.

FIG. 3B is a cross-sectional view showing one embodiment of the print according to the present invention. A print 307 comprises an object 309 and, provided on the object 309 in the following order, a receptive layer 305 with a thermally transferred image 308 formed thereon, an ionizing radiation-cured resin layer 304, and a release layer 303. In this print, a thermally transferred image is previously formed using a thermal transfer sheet on the receptive layer in the intermediate transfer recording medium as shown in FIG. 3A, and, thereafter, the receptive layer with a thermally transferred image formed thereon, the ionizing radiation-cured resin layer, and the release layer are transferred from the intermediate transfer recording medium onto the object so that the receptive layer with the image formed thereon comes into contact with the object, whereby the receptive layer, the ionizing radiation-cured resin layer, and the release layer are stacked on the object so as to cover the thermally transferred image.

Elements constituting the intermediate transfer recording medium will be described.

Substrate Film:

The substrate film 302 is not particularly limited, and the same substrate film as used in the conventional intermediate transfer recording medium as such may be used. Specific examples of preferred substrate films 302 include: thin paper, such as glassine paper, capacitor paper, or paraffin-waxed paper; and stretched or unstretched films of plastics, for example, highly heat resistant polyesters, such as polyethylene terephthalate, polyethylene naphthalate, polybutylene terephthalate, polyphenylene sulfide, polyether ketone, or polyether sulfone, and other plastics, such as polypropylene, polycarbonate, cellulose acetate, polyethylene derivative, polyvinyl chloride, polyvinylidene chloride, polystyrene, polyamide, polyimide, polymethylpentene, or ionomer. Composite films comprising a laminate of two or more materials selected from the above materials may also be used. The thickness of the substrate film 302 may be properly selected according to the material so as to provide proper strength, heat resistance and other properties. In general, however, the thickness of the substrate film is preferably about 1 to 100 $\mu$m.

If necessary, a backside layer may be provided by a conventional method on the surface of the substrate film remote from the transfer portion. The backside layer is provided for preventing fusing between the substrate film and a heating device, such as a thermal head, at the time of the transfer of the transfer portion onto the object using the intermediate transfer recording medium to improve the slidability of the intermediate transfer recording medium and may comprise the same resin as used in the prior art.

Peel Layer:

The peel layer 303 generally comprises, for example, a mixture of a resin having an acryl structure, a vinyl chloride-vinyl acetate copolymer, and a cellulose acetate with a thermosetting acrylic resin, a melamine resin, a nitrocellulose resin, and a polyethylene wax. The use of the resin having an acryl structure as a main component is particularly preferred. Further, a polyester resin or the like is preferably used for regulating the adhesion between the peel layer and the substrate film.

The peel layer may be formed by dissolving or dispersing, for example, a resin having an acryl structure and a polyester resin in a suitable solvent to prepare a coating liquid for a peel layer, coating the coating liquid onto a substrate film by gravure printing, screen printing, reverse coating using a gravure plate or the like, and drying the coating. The thickness of the peel layer is generally 0.1 to 10 $\mu$m on a dry basis.

Instead of the peel layer, a release layer may be provided on the substrate film. The release layer generally comprises a binder resin and a releasable material. Binder resins usable herein include: thermoplastic resins, for example, acrylic resins such as polymethyl methacrylate, polyethyl methacrylate, and polybutyl acrylate, vinyl resins such as polyvinyl acetate, vinyl chloride-vinyl acetate copolymer, polyvinyl alcohol, and polyvinyl butyral, and cellulose derivatives such as ethylcellulose, nitrocellulose, and cellulose acetate; and thermosetting resins such as unsaturated polyester resins, polyester resins, polyurethane resins, and aminoalkyd resins. Releasable materials include waxes, silicone waxes, silicone resins, melamine resins, fluororesins, finely divided talc or silica, and lubricants such as surfactants and metallic soaps.

The release layer may be formed by dissolving or dispersing the above resin in a suitable solvent to prepare a coating liquid for a release layer, coating the coating liquid onto a substrate film by gravure printing, screen printing, reverse coating using a gravure plate or other method, and drying the coating. The thickness of the release layer is generally 0.1 to 10 $\mu$m on a dry basis.

Ionizing Radiation-cured Resin Layer:

The intermediate transfer recording medium according to the present invention comprises a substrate film and a transfer portion provided on the substrate film. The transfer portion comprises at least a peel layer, an ionizing radiation-cured resin layer, and a receptive layer provided in that order on the substrate film.

The ionizing radiation-cured resin layer 304 mainly functions to impart various fastness and resistance properties to the thermally transferred image in the transfer portion 306. The ionizing radiation-cured resin layer is formed from an ionizing radiation-curable resin. The ionizing radiation-curable resin may be the same as used in the thermal transfer sheet and may be cured in the same manner as described above to form the ionizing radiation-cured resin layer.

The ionizing radiation-curable resin layer may be formed by dissolving or dispersing a composition containing the ionizing radiation-curable resin for an ionizing radiation-curable resin layer in a suitable solvent to prepare an ink for the formation of an ionizing radiation-curable resin layer, coating the ink onto the substrate film, for example, by gravure printing, screen printing, reverse coating using a gravure plate or other means, and drying the coating.

The ionizing radiation-curable resin layer may be formed in any desired thickness on the substrate film. However, thickness of the ionizing radiation-curable resin layer is 0.1 to 50 $g/m^2$, preferably about 1 to 20 $g/m^2$, on a dry basis.

Receptive Layer:

The receptive layer 305 is provided, as a part of the transfer portion constituting the intermediate transfer recording medium, so as to be located at the outermost surface remote from the substrate film. An image is formed by thermal transfer on the receptive layer from a thermal transfer sheet having a colorant layer. The intermediate transfer recording medium in its transfer portion with the image formed thereon is transferred onto an object, and, thus, a print is formed.

For this reason, a conventional resin material, which is receptive to a thermally transferable colorant such as a sublimable dye or a hot-melt ink, may be used as the material for the receptive layer. Examples of materials usable herein include: polyolefin resins such as polypropylene; halogenated resins such as polyvinyl chloride or polyvinylidene chloride; vinyl resins such as polyvinyl acetate, vinyl chloride-vinyl acetate copolymer, ethylene-vinyl acetate copolymer, or polyacrylic ester; polyester resins such as polyethylene terephthalate or polybutylene terephthalate; polystyrene resin; polyamide resin; resins of copolymers of olefins, such as ethylene or propylene, with other vinyl polymers; ionomers; cellulosic resins such as cellulose diastase; and polycarbonates. Vinyl chloride resins, acryl-styrene resins, or polyester resins are particularly preferred.

When the receptive layer is transferred through an adhesive layer onto an object, the receptive layer per se is not always required to be adhesive. On the other hand, when the receptive layer is transferred onto the object without through the adhesive layer, the formation of the receptive layer using a resin material having adhesive properties, such as vinyl chloride-vinyl acetate copolymer, is preferred.

The receptive layer may be formed by dissolving or dispersing a single or plurality of materials, selected from the above materials, optionally mixed with various additives or the like, in a suitable solvent such as water or an organic solvent to prepare a coating liquid for a receptive layer, coating the coating liquid by means such as gravure printing, screen printing, or reverse coating using a gravure plate, and drying the coating. The thickness (coverage) of the receptive layer is about 1 to 10 g/m² on a dry basis.

Object:

Next, the object 309 will be described. The intermediate transfer recording medium in its transfer portion with a thermally transferred image formed thereon is transferred onto the object. This can provide a print having thereon a thermally transferred image possessing excellent various fastness and resistance properties. The object, to which the intermediate transfer recording medium according to the present invention is applied, is not particularly limited, and examples thereof include natural pulp paper, coated paper, tracing paper, plastic films which are not deformed upon exposure to heat at the time of transfer, glasses, metals, ceramics, wood, and cloths.

Regarding the form and applications of the object, there is no limitation on the type, and examples thereof include: gold notes, such as stock certificates, securities, deeds, passbooks, railway tickets, streetcar tickets, stamps, postage stamps, appreciation tickets, admission tickets, and other tickets; cards, such as bank cards, credit cards, prepaid cards, membership cards, greeting cards, postcards, business cards, driver's licenses, IC cards, and optical cards; cases, such as cartons and containers; bags; forms control; envelops; tags; OHP sheets; slide films; bookmarks; calendars; posters; pamphlets; menus; passports; POP goods; coasters; displays; name plates; keyboards; cosmetics; accessories such as wristwatches and lighters; stationeries such as report pads; building materials; panels; emblems; keys; cloths; clothes; footwears; equipment or devices such as radios, televisions, electronic calculators, and OA equipment; various sample or pattern books; albums; and outputs of computer graphics and outputs of medical images.

In the formation of a thermally transferred image to produce the print according to the present invention, the intermediate transfer recording medium and the thermal transfer sheet comprising a colorant layer provided on a substrate are first provided. The intermediate transfer recording medium and the thermal transfer sheet are sandwiched and pressed between a heating device, such as a thermal head, and a platen roll so that the intermediate transfer recording medium in its transfer portion comes into contact with the thermal transfer sheet in its colorant layer. In this state, heat is selectively generated from the heat generating portion in a heating device according to image information to transfer the colorant in the colorant layer on the thermal transfer sheet onto the receptive layer in the intermediate transfer recording medium, whereby an image is recorded.

The thermal transfer sheet may be a conventional thermal transfer sheet. The colorant layer provided in the thermal transfer sheet comprises a heat-fusion ink or an ink containing a sublimable dye. The colorant layer comprises a material properly selected according to a contemplated print from heat-fusion inks and sublimable dye inks. A colorant layer comprising sublimable dyes used for producing prints having excellent gradation may be formed by properly providing conventional sublimable dyes, such as yellow, magenta, cyan, and black, in a face serial manner according to need. In monochromatic binary images such as characters or numerals, a thermal transfer sheet comprising a colorant layer comprising a heat-fusion ink possessing excellent density and sharpness may be used alone, or alternatively the colorant layer comprising the sublimable dyes and the heat-fusion ink layer may be provided in a face serial manner.

As described above, a thermally transferred image is formed as a mirror image, which is not an image in the final print but an image seen when the final image is reflected from a mirror onto the intermediate transfer recording medium in its transfer portion, and the intermediate transfer recording medium and an object are pressed so that the image face in the transfer portion with the thermally transferred image formed thereon comes into contact with the object, followed by transfer of the transfer portion onto the object by means of heating means such as a thermal head, a hot stamp, or a hot roll. Regarding the heating means for heating the transfer portion, in the case of a partial transfer, the use of a thermal head or a hot stamp is preferred, while, in the case of transfer onto the whole object, the adoption of the hot roll method is preferred.

Thus, a print is produced wherein the receptive layer and the ionizing radiation-cured resin layer have been stacked onto the object so as to cover the thermally transferred image (see FIG. 3B).

In the formation of the print according to the present invention, a transfer portion including a specified thermally transferred image is transferred onto an object in its specified position. In this case, in order to accurately perform registration of the position of the thermal transfer of each color at the time of the thermal transfer of the thermally transferred image, a method is preferably adopted wherein a conventional detection mark for detecting the position in each transfer is provided in the intermediate transfer recording medium and is detected with a detector and this detection is interlocked with a thermal transfer device to perform registration for thermal transfer.

EXAMPLES

The present invention will be described in more detail with reference to the following examples. In the following description, "parts" or "%" is by weight unless otherwise specified.

1: First Thermal Transfer Sheet According to the Present Invention

Example 1A

A 12 μm-thick polyethylene terephthalate film (Lumirror, manufactured by Toray Industries, Inc.) was provided as a substrate sheet. A coating liquid for a peel layer having the following composition was gravure coated on one side of the substrate sheet to form a peel layer at a coverage of 1.0 g/m² on a dry basis. A coating liquid for a scratch-resistant layer having the following composition was gravure coated on the peel layer for each picture plane unit as shown in FIG. 1A to form a scratch-resistant layer at a coverage of 4.0 g/m² on a dry basis. Further, as shown in FIG. 1A, a coating liquid for an adhesive layer having the following composition was gravure coated on the scratch-resistant layer and the peel layer to form an adhesive layer at a coverage of 1.0 g/m² on a dry basis. Thus, a thermal transfer sheet of Example 1A was prepared.

After coating of each layer in the thermal transfer sheet, the coating was dried by conventional hot-air drying. In the case of the scratch-resistant layer, however, after coating, the coating was dried by hot air and was then exposed to ultraviolet light emitted from an ultraviolet exposure system (provided with a high-pressure mercury lamp (output 120 W/cm) using ozone).

A coating liquid for a heat-resistant slip layer having the following composition was previously gravure coated at a coverage of 2.0 g/m² on a dry basis onto the other side (backside) of the substrate sheet to form the heat-resistant slip layer, and, further, after coating, the heat-resistant slip layer was heat aged to cure the coating.

| Coating liquid for peel layer: | |
|---|---|
| Acrylic resin (methyl methacrylate) | 80 parts |
| Polyester resin | 4 parts |
| Methyl ethyl ketone | 100 parts |
| Toluene | 100 parts |
| Coating liquid for scratch-resistant layer: | |
| Urethane acrylic resin | 100 parts |
| Polyfunctional urethane acrylate | 20 parts |
| Methyl ethyl ketone | 100 parts |
| Toluene | 100 parts |
| Coating liquid for adhesive layer: | |
| Vinyl chloride-vinyl acetate copolymer (1000 ALK, manufactured by Denki Kagaku Kogyo K.K.) | 20 parts |
| Methyl ethyl ketone | 40 parts |
| Toluene | 40 parts |
| Coating liquid for heat-resistant slip layer: | |
| Polyvinyl butyral resin (S-lec BX-1, manufactured by Sekisui Chemical Co., Ltd.) | 3.6 parts |
| Polyisocyanate (Burnock D 750-45, manufactured by Dainippon Ink and Chemicals, Inc.) | 19.2 parts |
| Phosphate surfactant (Plysurf A 208 S, manufactured by Dai-Ichi Kogyo Seiyaku Co., Ltd.) | 2.9 parts |
| Phosphate surfactant (Phosphanol RD 720, manufactured by Toho Chemical Industry Co., Ltd.) | 0.3 part |
| Talc (manufactured by Nippon Talc Co., Ltd.) | 0.2 part |
| Methyl ethyl ketone | 33 parts |
| Toluene | 33 parts |

Example 1B

A thermally transferable protective layer having a layer construction of peel layer/scratch-resistant layer/adhesive layer, which is the same layer construction as adopted in Example 1A, was formed on the same substrate sheet as used in the thermal transfer sheet prepared in Example 1A as shown in FIG. 1B. In this case, it is a matter of course that, regarding the coating area of each layer in the thermally transferable protective layer, the scratch-resistant layer was formed in a smaller area than the area of each of the peel layer and the adhesive layer. The area of the scratch-resistant layer is smaller than the area of an object in its transfer surface. Further, as shown in FIG. 1B, standard dye layers for a VDS card printer CP 510 were provided as thermally transferable colorant layers of yellow, magenta, and cyan. Thus, a thermal transfer sheet of Example 1B was prepared.

Comparative Example 1A

A thermal transfer sheet of Comparative Example 1A was prepared in the same manner as in Example 1A, except that, in the preparation of the thermal transfer resin layer in the thermal transfer sheet, a coating liquid for a thermal transfer resin layer having the following composition was used instead of the coating liquid used in Example 1A.

| Coating liquid for thermal transfer resin layer: | |
|---|---|
| Polyester resin (U-18, manufactured by Arakawa Chemical Industries, Ltd.) | 20 parts |
| Methyl ethyl ketone | 50 parts |
| Toluene | 50 parts |

Next, prints for evaluation were provided under the following conditions.

An object comprising a card substrate having the following composition was provided. Further, a thermal printer for cards (a card printer CP 510, manufactured by VDS) and a thermal transfer sheet comprising standard dye layers for the VDS card printer CP 510 were provided. The color separation of a photograph of a face was carried out, and each dye was transferred onto the object according to image information on yellow, magenta, and cyan obtained by the color separation to form a full-color photograph-like facial image. For Example 1B, however, since the thermal transfer sheet has a thermally transferable colorant layer (dye layer), the thermally transferable colorant layer was used.

| Composition of material for card substrate: | |
|---|---|
| Polyvinyl chloride compound (degree of polymerization: 300) (content of additives such as stabilizer about 10%) | 100 parts |
| White pigment (titanium oxide) | 10 parts |
| Plasticizer (DOP) | 0.5 part |

A thermally transferable protective layer was transferred from the above thermal transfer sheet onto the image in the print so as to cover the image, as shown in FIG. 1D, by means of the same thermal printer for cards as used above (using the same thermal head as used above).

Results of Evaluation:

Prints, in which the protective layer was transferred, from the thermal transfer sheets prepared in Examples 1A and 1B, onto the image, had excellent various fastness or resistance properties such as excellent lightfastness, chemical resistance, plasticizer resistance, solvent resistance, and weathering resistance even when exposed to conditions which had simulated very severe service conditions. Further, for the thermal transfer sheets prepared in Examples 1A and 1B, the protective layer could be transferred onto the image on the object with good transferability. That is, an even protective layer was transferred, and the edge of the transferred protective layer was linear.

For the thermal transfer sheet prepared in Example 1B wherein the thermally transferable colorant layer and the thermally transferable protective layer were repeatedly formed in a face serial manner on an identical substrate sheet, after the formation of an image on the object, the protective layer could be subsequently transferred onto the image to prepare a print without the replacement of the thermal transfer sheet with another thermal transfer sheet. This saved a lot of time and could realize the production of a print with high efficiency.

By contrast, the print, in which the protective layer had been transferred from the thermal transfer sheet prepared in Comparative Example 1A onto the image, was unsatisfactory in various fastness or resistance properties such as lightfastness, chemical resistance, plasticizer resistance, solvent resistance, and weathering resistance when exposed to conditions which had simulated severe service conditions.

2: Second Thermal Transfer Sheet According to the Present Invention

Example 2A

A 12 μm-thick polyethylene terephthalate film (Lumirror, manufactured by Toray Industries, Inc.) was provided as a substrate sheet. A coating liquid for a peel layer having the following composition was gravure coated on one side of the substrate sheet to form a peel layer at a coverage of 1.0 g/m² on a dry basis. A coating liquid for a thermal transfer resin layer having the following composition was gravure coated on the peel layer to form a thermal transfer resin layer at a coverage of 4.0 g/m² on a dry basis. Further, a coating liquid for an adhesive layer having the following composition was gravure coated on the thermal transfer resin layer to form an adhesive layer at a coverage of 1.0 g/m² on a dry basis. Thus, a thermal transfer sheet of Example 2A was prepared.

After coating of each layer in the thermal transfer sheet, the coating was dried by conventional hot-air drying. In the case of the thermal transfer resin layer, however, after coating, the coating was dried by hot air and was then exposed to ultraviolet light emitted from an ultraviolet exposure system (provided with a high-pressure mercury lamp (output 120 W/cm) using ozone).

A coating liquid for a heat-resistant slip layer having the following composition was previously gravure coated at a coverage of 2.0 g/m² on a dry basis onto the other side (backside) of the substrate sheet to form the heat-resistant slip layer, and, further, after coating, the heat-resistant slip layer was heat aged to cure the coating.

| Coating liquid for peel layer: | |
| --- | --- |
| Acrylic resin (methyl methacrylate) | 80 parts |
| Polyester resin | 4 parts |
| Methyl ethyl ketone | 100 parts |
| Toluene | 100 parts |
| Coating liquid for thermal transfer resin layer: | |
| Urethane acrylic resin | 100 parts |
| Polyfunctional urethane acrylate | 20 parts |
| Methyl ethyl ketone | 100 parts |
| Toluene | 100 parts |
| Coating liquid for adhesive layer: | |
| Vinyl chloride-vinyl acetate copolymer (1000 ALK, manufactured by Denki Kagaku Kogyo K.K.) | 20 parts |
| Methyl ethyl ketone | 40 parts |
| Toluene | 40 parts |
| Coating liquid for heat-resistant slip layer: | |
| Polyvinyl butyral resin (S-lec BX-1, manufactured by Sekisui Chemical Co., Ltd.) | 3.6 parts |
| Polyisocyanate (Burnock C 750-45, manufactured by Dainippon Ink and Chemicals, Inc.) | 19.2 parts |
| Phosphate surfactant (Plysurf A 208 S, manufactured by Dai-Ichi Kogyo Seiyaku Co., Ltd.) | 2.9 parts |
| Phosphate surfactant (Phosphanol RD 720, manufactured by Toho Chemical Industry Co., Ltd.) | 0.3 part |
| Talc (manufactured by Nippon Talc Co., Ltd.) | 0.2 part |
| Methyl ethyl ketone | 33 parts |
| Toluene | 33 parts |

Example 2B

A thermally transferable protective layer having a layer construction of peel layer/thermal transfer resin layer/adhesive layer, which is the same layer construction as adopted in Example 2A, was formed on the same substrate sheet as used in the thermal transfer sheet prepared in Example 2A. Further, as shown in FIG. 2B, standard dye layers for a VDS card printer CP 510 were provided as thermally transferable colorant layers of yellow, magenta, and cyan. Thus, a thermal transfer sheet of Example 2B was prepared.

Comparative Example 1A

A thermal transfer sheet of Comparative Example 2A was prepared in the same manner as in Example 2A, except that, in the preparation of the thermal transfer resin layer in the thermal transfer sheet, a coating liquid for a thermal transfer resin layer having the following composition was used instead of the coating liquid used in Example 2A.

| Coating liquid for thermal transfer resin layer: | |
| --- | --- |
| Polyester resin (U-18, manufactured by Arakawa Chemical Industries, Ltd.) | 20 parts |
| Methyl ethyl ketone | 50 parts |
| Toluene | 50 parts |

Next, prints for evaluation were provided under the following conditions.

An object comprising a card substrate having the following composition was provided. Further, a thermal printer for cards (a card printer CP 510, manufactured by VDS) and a thermal transfer sheet comprising standard dye layers for the VDS card printer CP 510 were provided. The color separation of a photograph of a face was carried out, and each dye was transferred onto the object according to image information on yellow, magenta, and cyan obtained by the color separation to form a full-color photograph-like face image. For Example 2B, however, since the thermal transfer sheet has a thermally transferable colorant layer (dye layer), the thermally transferable colorant layer was used.

| Composition of material for card substrate: | |
| --- | --- |
| Polyvinyl chloride compound (degree of polymerization: 800) (content of additives such as stabilizer: about 10%) | 100 parts |
| White pigment (titanium oxide) | 10 parts |
| Plasticizer (DOP) | 0.5 part |

A thermally transferable protective layer was transferred from the above thermal transfer sheet onto the image in the print so as to cover the image, as shown in FIG. 2D, by means of the same thermal printer for cards as used above (using the same thermal head as used above).

Results of Evaluation:

Prints, in which the protective layer was transferred, from the thermal transfer sheets prepared in Examples 2A and 2B, onto the image, had excellent various fastness or resistance properties such as excellent lightfastness, chemical resistance, plasticizer resistance, solvent resistance, and weathering resistance even when exposed to conditions which had simulated very severe service conditions. Further, for the thermal transfer sheets prepared in Examples 2A and 2B, the protective layer could be transferred onto the image on the object with good transferability. That is, an even protective layer was transferred, and the edge of the transferred protective layer was linear.

For the thermal transfer sheet prepared in Example 2B wherein the thermally transferable colorant layer and the thermally transferable protective layer were repeatedly formed in a face serial manner on an identical substrate sheet, after the formation of an image on the object, the protective layer could be subsequently transferred onto the image to prepare a print without the replacement of the thermal transfer sheet with another thermal transfer sheet. This saved a lot of time and could realize the production of a print with high efficiency.

By contrast, the print, in which the protective layer had been transferred from the thermal transfer sheet prepared in Comparative Example 2A onto the image, was unsatisfactory in various fastness or resistance properties such as lightfastness, chemical resistance, plasticizer resistance, solvent resistance, and weathering resistance when exposed to conditions which had simulated severe service conditions.

3: Intermediate Transfer Recording Medium According to the Present Invention

Example 3A

A 12 μm-thick transparent polyethylene terephthalate film was first provided as a substrate film. A coating liquid for a peel layer having the following composition was coated by gravure reverse coating on the surface of the substrate film, and the coating was dried to form a peel layer at a coverage of 1.0 g/m² on the substrate film.

| Coating liquid for peel layer: | |
|---|---|
| Acrylic resin (methyl methacrylate) | 80 parts |
| Polyester resin | 4 parts |
| Methyl ethyl ketone | 100 parts |
| Toluene | 100 parts |

A coating liquid for an ionizing radiation-curable resin layer having the following composition was gravure coated onto the peel layer to form an ionizing radiation-curable resin layer at a coverage of 4.0 g/m² on a dry basis. Further, a coating liquid for a receptive layer having the following composition was gravure coated on the cured resin layer to form a receptive layer at a coverage of 2.0 g/m² on a dry basis. Thus, an intermediate transfer recording medium of Example 3A was prepared.

After coating of each layer in the intermediate transfer recording medium, the coating was dried by conventional hot-air drying. In the case of the ionizing radiation-curable resin layer, however, after coating, the coating was dried by hot air and was then exposed to ultraviolet light emitted from an ultraviolet exposure system (provided with a high-pressure mercury lamp (output 120 W/cm) using ozone) to form an ionizing radiation-cured resin layer.

A coating liquid for a heat-resistant slip layer having the following composition was previously gravure coated at a coverage of 2.0 g/m² on a dry basis onto the other side (backside) of the substrate film to form the heat-resistant slip layer, and, further, after coating, the heat-resistant slip layer was heat aged to cure the coating.

| Coating liquid for ionizing radiation-curable resin layer: | |
|---|---|
| Urethane acrylic resin | 100 parts |
| Polyfunctional urethane acrylate | 20 parts |
| Methyl ethyl ketone | 100 parts |
| Toluene | 100 parts |
| Coating liquid for receptive layer: | |
| Vinyl chloride-vinyl acetate copolymer | 40 parts |
| Acrylic silicone | 1.5 parts |
| Methyl ethyl ketone | 50 parts |
| Toluene | 50 parts |
| Coating liquid for heat-resistant slip layer: | |
| Polyvinyl butyral resin (S-lec BX-1, manufactured by Sekisui Chemical Co., Ltd.) | 3.6 parts |
| Polyisocyanate (Burnock D 750-45, manufactured by Dainippon Ink and Chemicals, Inc.) | 19.2 parts |
| Phosphate surfactant (Plysurf A 208 S, manufactured by Dai-Ichi Kogyo Seiyaku Co., Ltd.) | 2.9 parts |
| Phosphate surfactant (Phosphanol RD 720, manufactured by Toho Chemical Industry Co., Ltd.) | 0.3 part |
| Talc (manufactured by Nippon Talc Co., Ltd.) | 0.2 part |
| Methyl ethyl ketone | 33 parts |
| Toluene | 33 parts |

Comparative Example 3A

An intermediate transfer recording medium of Comparative Example 3A was prepared in the same manner as in Example 3A, except that a coating liquid for a thermal transfer resin layer having the following composition was used instead of the coating liquid for the ionizing radiation-curable resin layer in the intermediate transfer recording medium.

| Coating liquid for thermal transfer resin layer: | |
|---|---|
| Polyester resin (U-18, manufactured by Arakawa Chemical Industries, Ltd.) | 20 parts |
| Methyl ethyl ketone | 50 parts |
| Toluene | 50 parts |

Next, prints for evaluation were provided under the following conditions.

A thermal printer for cards (a card printer CP 510, manufactured by VDS) and a thermal transfer sheet comprising standard dye layers for the VDS card printer CP 510 were provided. The color separation of a photograph of a face was carried out, and each dye was transferred onto the receptive layer in each of the intermediate transfer recording media prepared in the example and comparative example according to image information on yellow, magenta, and cyan to form a full-color photograph-like facial image.

The receptive layer including the thermal transfer image and the ionizing radiation-cured resin layer (the thermal transfer resin layer in the comparative example) were transferred onto an object comprising a card substrate having the following composition by means of the same thermal printer for cards as used above (using the same thermal head as used above).

| Composition of material for card substrate: | |
| --- | --- |
| Polyvinyl chloride compound (degree of polymerization: 800) (content of additives such as stabilizer: about 10%) | 100 parts |
| White pigment (titanium oxide) | 10 parts |
| Plasticizer (DOP) | 0.5 part |

Results of Evaluation:

Prints, in which the ionizing radiation-cured resin layer formed in Example 3A was provided on the image, had excellent various fastness or resistance properties such as excellent lightfastness, chemical resistance, plasticizer resistance, solvent resistance, and weathering resistance even when exposed to conditions which had simulated very severe service conditions. Further, for the intermediate transfer recording medium prepared in Example 3A, the transfer portion could be transferred onto the object with good transferability. That is, the transfer portion could be evenly transferred, and the edge of the transferred transfer portion was sharp.

By contrast, the print, in which the resin layer formed in Comparative Example 3A was provided on the image, was unsatisfactory in various fastness or resistance properties such as lightfastness, chemical resistance, plasticizer resistance, solvent resistance, and weathering resistance when exposed to conditions which had simulated severe service conditions.

What is claimed is:

1. An intermediate transfer recording medium comprising a substrate film and a transfer portion provided on the substrate film, wherein said transfer portion comprises at least a peel layer, a cured product of an ionizing radiation-curable resin layer, and a receptive layer in that order as viewed from the substrate film side, and the ionizing radiation-curable resin layer comprises an urethane-modified acrylic base resin.

2. The intermediate transfer recording medium according to claim 1, wherein the ionizing radiation-curable resin further comprises 5 to 40 parts by weight, based on 100 parts by weight of the urethane-modified acrylic base resin, of an oligomer.

3. A print produced by providing the intermediate transfer recording medium according to claim 1, wherein the print is obtained by the steps of;

forming a thermal transfer image on the intermediate transfer recording medium in its transfer portion, and transferring the transfer portion with the image formed thereon onto an object.

* * * * *